UNITED STATES PATENT OFFICE.

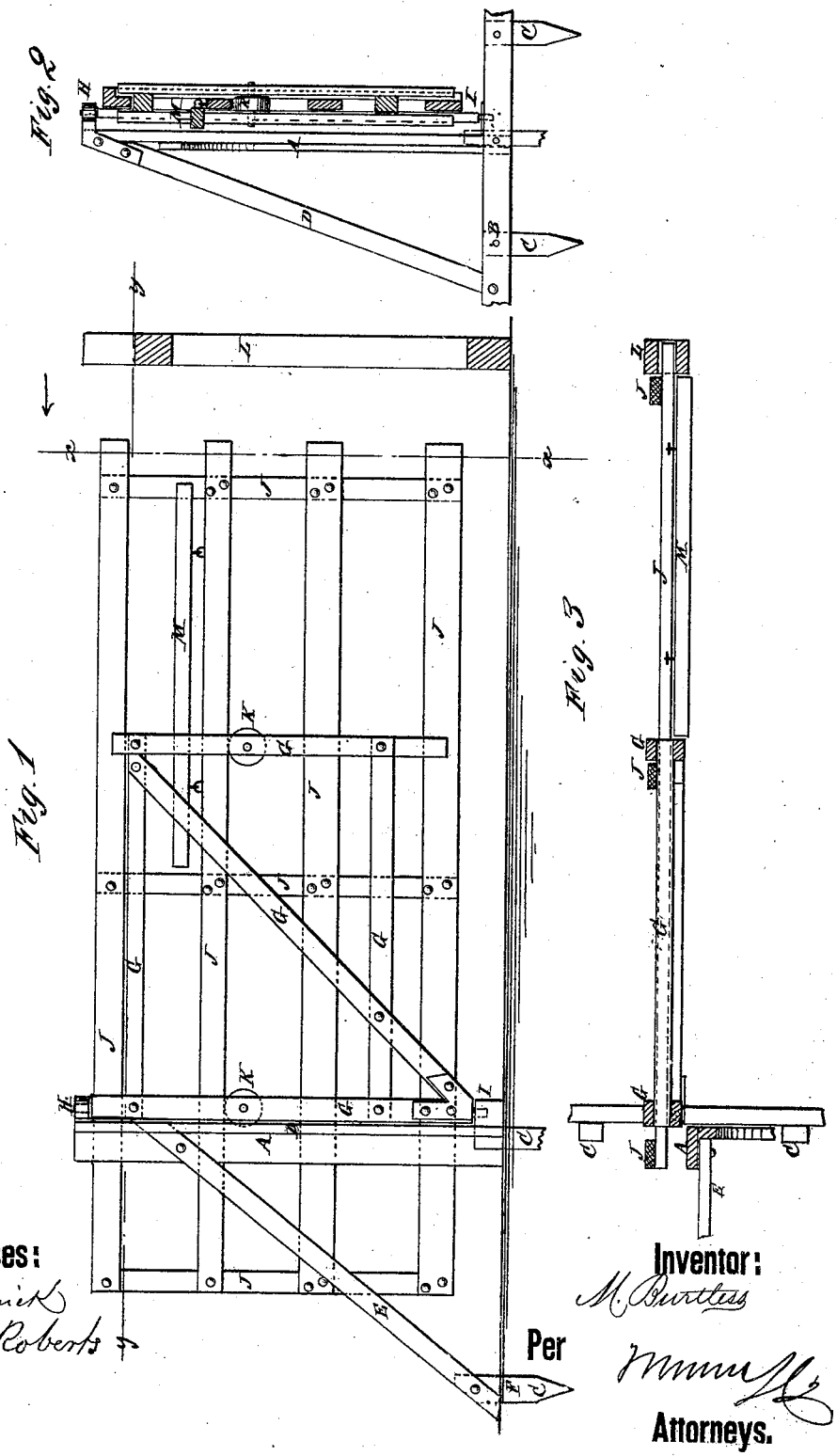

MAHLON BURTLESS, OF SENECA FALLS, NEW YORK.

IMPROVEMENT IN FARM-GATES.

Specification forming part of Letters Patent No. 140,612, dated July 8, 1873; application filed March 22, 1873.

*To all whom it may concern:*

Be it known that I, MAHLON BURTLESS, of Seneca Falls, in the county of Seneca and State of New York, have invented a new and useful Improvement in Gate, of which the following is a specification:

Figure 1 is a side view of my improved gate, shown as partly open. Fig. 2 is a vertical cross-section of the same taken through the line $x\,x$, Fig. 1. Fig. 3 is a horizontal section of the same taken through the line $y\,y$, Fig. 1.

The invention consists in the improvement of gates, as hereinafter described and pointed out in the claim.

A is the rear post, the lower end of which is secured in the middle part of the base-bar B, which rests upon the ground, and is secured in place by being attached to stakes C driven into the ground. The post A is strengthened by braces D E. The brace D extends from the upper end of the post A to the outer part of the base-bar B, upon the opposite side of the post A from that along which the gate slides. The other brace, E, extends from the upper part of the post A to the ground in the rear of the post, and about in line with the gate, and is secured to a stake, F, driven into the ground. The braces D E, or either of them, may be replaced by a fence, when the said fence happens to be in position to support the post A. G is a skeleton gate or frame, about half the length of the gate, and consisting of two horizontal bars connected at their ends by vertical bars, and strengthened by an inclined or diagonal brace-bar. The gate or frame G is hinged to the post A by hinges H I, connecting the upper and lower ends of the rear vertical bar of the frame G with the post A. The vertical bars of the frame G are made double to form spaces to receive the horizontal bars of the gate J, so that the said gate J may slide back and forth upon the frame G, the friction being relieved by the friction-wheels K, pivoted to and between the parts of the double vertical bars of the frame G, in such a position that one of the horizontal bars of the gate J may rest upon them. The movement of the gate J upon the frame G is limited by a cross-bar attached to the middle part of the said gate J, and which strikes against the said vertical bars of the frame G. The ends of the horizontal bars of the gate J project beyond the front vertical bars, so as to enter slots or openings in the front post L, which slots or openings are so arranged that the lower edges of two or more of the said projecting ends may be supported, so that the weight of the gate when closed will not come upon the rear post, thus resisting any tendency of the gate to sag. M is the latch, which is hinged to the upper edge of one of the upper horizontal bars of the gate J, in such a way that when the gate is fully closed it may drop down, as shown in Fig. 2, so that its rear end may rest against the forward edge of the front vertical bar of the hinged frame G, and firmly fasten the gate.

To open the gate, the latch M is turned up so that its rear end may enter the space between the parts of the front vertical bar of the frame G, which allows the gate to be slid back upon the wheels K for half its length or less, when the gate J and frame G may be swung around upon the hinges H I to fully open the gate-way.

Having thus described my invention, I claim as new and desire to secure by Letters Patent—

The hinged latch M, arranged to operate in connection with the gate J and hinged frame G, substantially as herein shown and described.

MAHLON BURTLESS.

Witnesses:
JAMES T. GRAHAM,
ALEX. F. ROBERTS.